Nov. 1, 1960
A. VASSILIEV ET AL
2,958,664
MAKING MANGANESE-ZINC FERRITES
Filed Jan. 16, 1956
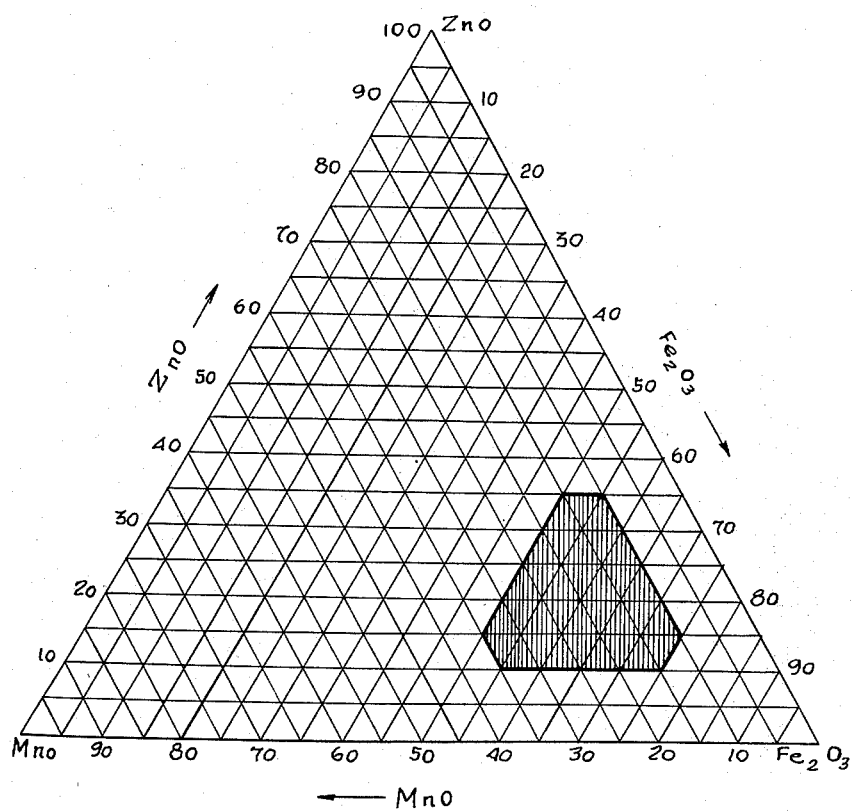
INVENTOR.
AVENIR VASSILIEV
RENÉ CLEMENT
PIERRE VARIERAS
BY

United States Patent Office 2,958,664
Patented Nov. 1, 1960

2,958,664
MAKING MANGANESE-ZINC FERRITES

Avenir Vassiliev, René Clement, and Pierre Varieras, Paris, France, assignors to Steatite Research Corporation, Keasbey, N.J., a corporation of Delaware Filed Jan. 16, 1956, Ser. No. 559,321

Claims priority, application France Jan. 28, 1955

2 Claims. (Cl. 252—62.5)

The invention concerns ferro-magnetic ferrites of manganese and zinc and methods of manufacturing them.

Various manufacturing process of these binary ferrites are known, which consist in mixing the composing oxides, in a state of fine powders, calcining and remilling them, adding binders, forming parts of said mixture by pressing or extruding, for example, and submitting the parts to an appropriate thermic treatment.

The manufacturing process is very delicate: the properties of the final product depend to a large degree on factors, such as the purity of the raw materials used, the manner of preparing these raw materials, the manner of mixing them, the rise and fall of temperature during firing and the atmosphere in which the firing is taking place.

Such processes have been described in French Patent 906,784, filed August 16, 1944, corresponding to U.S. Patent No. 2,551,711, wherein it is stated that the firing should be effected in a oxygen atmosphere; in French Patent 937,076, filed September 2, 1946, corresponding to U.S. Patent No. 2,636,860, according to which the firing is done in a nitrogen atmosphere, and in French Patent 943, 494, filed May 20, 1947, according to which the firing is done under water vapors.

The processes described in said patents require perfectly pure raw materials.

This invention refers to a manufacturing process of manganese and zinc, containing ferrites which depends less on the above mentioned risks, and is less limited by the necessity of using very pure raw materials. For a given composition, better properties (larger maximum permeability and induction) are obtained, compared with the same composition, under the processing conditions previously known.

Furthermore, this invention concerns the ferrite materials obtained by means of said process.

The process according to the invention is essentially characterized by the following steps, taken separately or in combinations:

(1) The initial mixture of iron, manganese and zinc oxides or of products capable to render these oxides in the course of thermal processing, is calcined (preheated) at a temperature between 800 and 1,250° C., followed by crushing, and mixing with suitable binder, forming and firing of the molded pieces.

(2) The final firing is effected at a temperature between 1,200 and 1,380° C.

(3) The composition of the mixture is kept in the following limits:

|  | Mol percent |
|---|---|
| $Fe_2O_3$ | 50 to 75 |
| ZnO | 10 to 37 |
| MnO | 10 to 35 |

(4) Preferably, the composition is kept within the following narrower limits:

|  | Mol percent |
|---|---|
| $Fe_2O_3$ | 51 to 60 |
| ZnO | 18 to 25 |
| MnO | 18 to 30 |

(5) The calcining (first heat treatment) is effected in a controlled atmosphere.

(6) Preferably, said controlled atmosphere consists of nitrogen.

(7) Preferably, the final firing is effected at a temperature between 1,250 and 1,380° C.

(8) The firing is done in an atmosphere containing a large quantity of water vapor.

(9) Preferably, if an easy industrial process is required, the initial mixture is obtained by means of crushing the raw constituents.

(10) The initial mixture mentioned is obtained by means of co-precipitation, for instance, by means of a base, of iron, manganese and zinc oxides, from a solution of their soluble salts, or by any other process, such as evaporation of the solvent in a solution of salts of Mn, Zn and Fe.

This invention will be better understood with the aid of the non-limitary examples of execution given below and of the drawing attached, representing a triangular diagram of compositions as given under point 3 above.

Example 1

Prepare by crushing and mixing the following initial mixture:

|  | Grams |
|---|---|
| $Fe_2O_3$ (99% purity) | 67 |
| ZnO (99.8% purity) | 13 |
| $MnO_2$ (industrial type (degree of purity approx. 92–96%)) | 20 |

From this mixture, parts are molded under a pressure of 1 ton per sq. cm., with 1% polyvinyl alcohol as binder.

The table below gives various variants of the thermal treatment conditions, with the magnetic properties obtained:

$B_s$ = induction saturation expressed in gauss, for a field of 25 oersteds
$\mu_0$ = initial permeability
$\theta_C$ = Curie point
$T_c$ = the calcining temperature, $T_b$ the firing temperature of the pressed parts
($\theta_C$ and T are expressed in centigrades)

| | Treatments | | | | Properties | | |
|---|---|---|---|---|---|---|---|
| | Pre-calcining | | Calcining | | | | |
| | $T_c$ | Atmosphere | $T_b$ | Atmosphere | $B_s$ | $\mu_0$ | $\theta_c$ |
| (a) | 940 | air | 1,320 | air | 3,200 | 800 | 150 |
| (b) | 940 | nitrogen | 1,320 | do | 3,400 | 900 | 155 |
| (c) | 940 | do | 1,320 | water vapor | 4,400 | 1,300 | 175 |
| (d) | 940 | air | 1,300 | do | 4,000 | 1,050 | 160 |

Example 2

Same process as above, with the following composition of the initial mixture:

| | Grams |
|---|---|
| $Fe_2O_3$ (99% purity) | 140 |
| ZnO (99.5% purity) | 28 |
| Industrial manganese spar, purified (degree of purity approx. 98%) | 46 |

The thermal treatments and the properties of the product obtained are given in the table below, the symbols being the same as with Example 1. In addition, $H_c$ designates the coercive force, given in oersteds:

| | Treatments | | | | Properties | | |
|---|---|---|---|---|---|---|---|
| | Pre-calcining | | Calcining | | | | |
| | $T_c$ | Atmosphere | $T_f$ | Atmosphere | $B_s$ | $\mu_0$ | $H_c$ |
| (a) | 1,000 | air | 1,300 | water vapor | 3,690 | 950 | 0.54 |
| (b) | 1,000 | nitrogen | 1,300 | do | 4,230 | 1,000 | 0.25 |
| (c) | 1,000 | air | 1,300 | do | 2,400 | 290 | 0.25 |

We claim:

1. In a process for the manufacture of manganese-zinc ferrites with high maximum permeability from relatively impure components, the steps comprising providing a mixture consisting essentially of the following ingredients in the proportions set forth:

| | Mol percent |
|---|---|
| $Fe_2O_3$ | 50 to 75 |
| ZnO | 10 to 35 |
| MnO | 10 to 35 | precalcining this mixture in an atmosphere of nitrogen at 800° C. to 1250° C., grinding the precalcined material, molding the ground material and firing the molded pieces at a temperature of about 1250° C. to 1380° C. in an atmosphere consisting essentially of water vapor.

2. The process of claim 1 wherein the proportions of the ingredients are as follows:

| | Mol percent |
|---|---|
| $Fe_2O_3$ | 51 to 60 |
| ZnO | 18 to 25 |
| MnO | 18 to 30 |

References Cited in the file of this patent

UNITED STATES PATENTS

| 2,535,025 | Schoenberg | Dec. 26, 1950 |
| 2,579,978 | Snoek et al. | Dec. 25, 1951 |
| 2,636,860 | Snoek et al. | Apr. 28, 1953 |

FOREIGN PATENTS

| 141,377 | Australia | May 28, 1951 |
| 674,828 | Great Britain | July 2, 1952 |
| 677,418 | Great Britain | Aug. 13, 1952 |

OTHER REFERENCES

R.C.A. Review, September 1950, p. 346.
Nature, Oct. 25, 1952, p. 707.